Sept. 7, 1965 L. A. SCHOLZ 3,204,255
CONVERTIBLE BED
Filed July 23, 1962
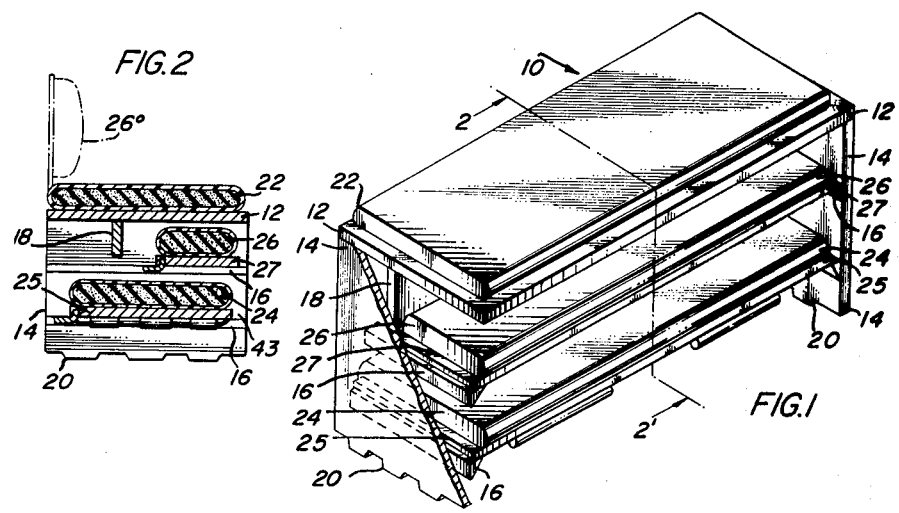
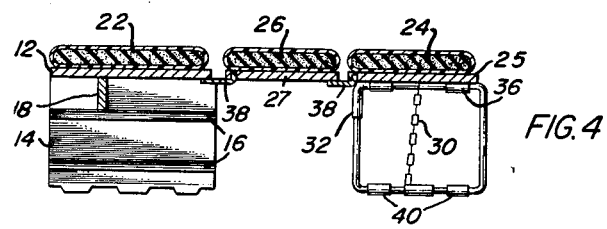
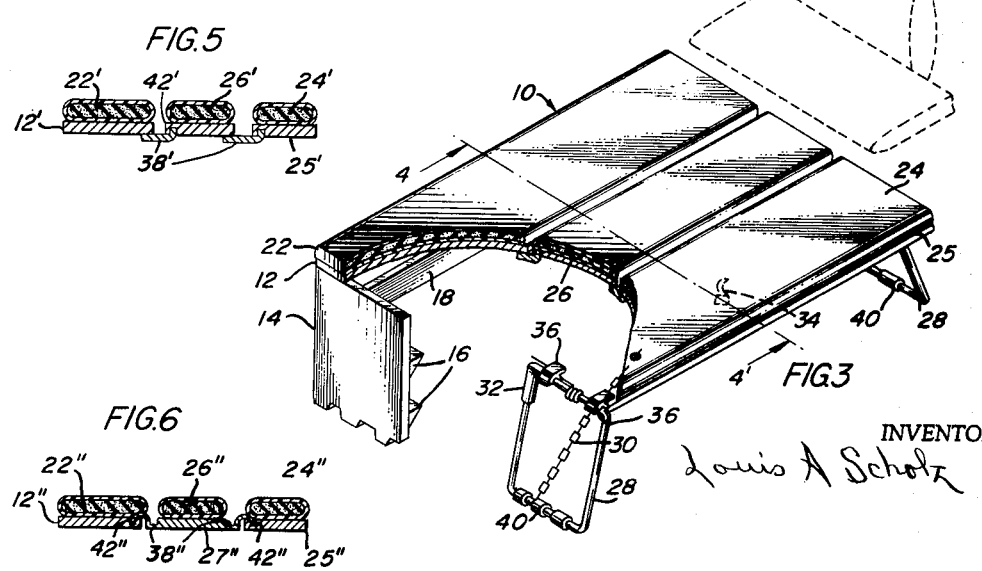
INVENTOR
Louis A Scholz

… …

United States Patent Office 3,204,255
Patented Sept. 7, 1965

3,204,255
CONVERTIBLE BED
Louis A. Scholz, State Rte. 32, Sykesville, Md.
Filed July 23, 1962, Ser. No. 211,754
5 Claims. (Cl. 5—21)

This invention relates in general to convertible bedding and in particular to a convertible bench and bed for use in and outside of vehicles for land, air and water.

The problem of providing a convertible bed for use in and out of automobiles, and in particular, automobiles such as station wagons or the like sold under, for example, the trademarks. Volkswagen or Chevrolet Greenbriar and having a general box-like configuration and usually also a corrugated floor to provide compactness on one hand and versatility on the other. In order to get room for a large man to sleep, a hammock or folding bed has been tried, supported on the top surfaces of the backs of the existing seats. This had the disadvantage of being too difficult to get into because it was too high and therefore too close to the ceiling. Other attempts have been made by opening up the trunk, or folding down the back of a front seat, but all of these have the disadvantage of requiring a very complex and time consuming installation. Quite often these intallations require extensive modification of the automobile to allow for installation.

An object of this invention is to provide a simple, easily installed and removed combination seat or bench, and bed, which will be compact when in the stored position, sturdy when in the open position and easily used within or outside of an automobile.

Another object is to provide a seat for use in an automobile that is stable as a seat and can be quickly and efficiently converted into two single beds, one twin bed or a double bed using the horizontal portion of an automobile seat as a cooperating portion of this bed.

A further object is to provide a compact support that can be easily changed to two single supports or one combined support or a support with a back rest, all in cooperation with the walls of an automobile, to prevent accidental movement.

Various other objects and advantages will appear from the following description and claims and accompanying drawings, which will disclose by way of examples, the principle of the invention, and the preferred mode, which has been contemplated, of applying that principle.

In the drawings:

FIGURE 1 is a fragmentary perspective view of the device for use as a bench.

FIGURE 2 is a vertical sectional view taken along line 2—2 of FIGURE 1.

FIGURE 3 is a fragmentary perspective view of the device in open position with cooperating automotive seat shown in phantom.

FIGURE 4 is a vertical sectional view along line 4—4 of FIGURE 3.

FIGURE 5 is a vertical sectional view along line 4—4 of another embodiment of FIGURE 3.

FIGURE 6 is a vertical sectional view along line 4—4 of a third embodiment of FIGURE 3.

*General description.*—Referring to FIGURE one, the device, a car bed 10 is shown in its stored position for use as a bench and is constructed in a simple box like fashion with the first horizontal member 12 being supported by legs 14 at each end. There legs are rigidly attached in a manner known in the art, but not shown in FIGURE 1, usually by screws and gluing when the members are made of plywood and riveting and welding when they are made of metal. There are two pair of ledges 16 attached to the inner faces of the legs 14 in a spaced relationship so that the other two horizontal support members 25 and 27 may be slid in to rest on these ledges for support. Also, there can be a reinforcing member 18 attached to the underside of first horizontal support member 12 and to the inside faces of the two legs 16. These legs 16 are provided with notched or serrated feet 20 to provide castellated surfaces so that these feet can mate to the undulations or corrugations of the floor of a car or boat or other vehicle, (not shown).

This top horizontal support 12 has a cushion 22 of foam rubber or polyethylene or similar materials enclosed in a plastic covering such as Naugahide which is a trademark for a cloth faced with plastic, all formed and attached or merely set on support 12 as is custom in the art.

The second horizontal support 25 also has its cushion 24 as does the third horizontal support 27 have its cushion 26.

Proceeding to FIGURE 2, the reinforcing rib 18 can be seen clearly in cross section to make a T section of the structure of the first horizontal support 12. Also shown in this view are the little humps 43 or nobs on the end of ledges 16 that prevent the second and third horizontal support members from sliding out of the stored position as might be the case due to the vibration imparted from the vehicle, if the hump were not there.

In FIGURE 3, the details of the folding legs 28 of second horizontal member 25 are shown. The hinges 36 hold the base of the leg 28 to the underside of the second horizontal member 25 in a pivoted or hinged relationship and spring 32 forces the legs 28 to the open position for easy and quick erection of this second horizontal support member 25 as soon as catch 34 is moved to release these legs 28. The movement of these legs 28 is stopped at a position slightly greater than 90 degrees by chain 30 so that any further loading of the horizontal member 25 will only make for more stability and rigidity in the positioning of these hinged legs 28. The bushings 40 serve to produce the same serrated bottom face or castellated surface to these folding legs 28 as the serrated face 20 did on the vertical legs 14 and serve for the same purpose.

Also shown in phantom in this view is a portion of any automobile seat in its position adjacent to one edge of the infolded car bed 10. In this position the bed 10 can be used with the seat 44 for extra width or length according to the dimensions of the bed 10.

In FIGURE 4, the relation of the third horizontal support member 27, to the first and second support members 12 and 25 is shown. This third member 27 is supported by resting on ledges or connectors 38 attached to the undersides of first and second members 12 and 25.

Other embodiments of these connectors such as 38' are shown in FIGURE 5 wherein there are mating grooves 42 recessed in the underside of third horizontal member.

In FIGURE 6, another embodiment is shown where the connectors 38' are attached to the underside of the third horizontal member and support is obtained by a clamping or connecting action against the upper sides of the first and second horizontal members 12" and 25" and in mating grooves 42" in this upper surface of the same first and in this embodiment also the second horizontal support member. It can be seen from an examination of this structure that in the embodiment described above, the middle or third horizontal support member 27" is both supported by and connected to the first and second horizontal support members 12" and 25" to form one substantially continuous surface.

By dividing the main sleeping or support surface of the bed into at least three units, advantage is taken of the fact that in modern upholstering technology 3 to 4 inches is now sufficient for a quite comfortable sleeping surface including a rigid support and that three times 3 or 4 inches is 9 to 12 inches which is equal or less than the height of an average vehicle seat. Therefore it is possible to arrive at a design for a bed and bench which is simple, compact, versatile and adaptable to use in or out of a vehicle such as a boat or automobile without having objectionable width to the device in the folded or closed position.

Having thus described my invention, I am aware that many modifications may be made of three horizontal support members any one, two or three with folding legs as though there were one, two or three parts similar with the second horizontal support 25 as shown in FIGURE 3. Various designs are possible for accomplishing my teaching and the basic principles of the other features of my invention are also subject to utilization in various embodiments.

Accordingly, I do not seek to be limited to the specific construction described hereinabove, except as set forth in the appended claims.

What is claimed is:

1. A convertible support structure for use on both smooth and corrugated support surfaces comprising at least first, second, and third horizontal support members, said first horizontal support member having a top wall, and at least two vertical legs rigidly attached at each end of said top wall said legs having castellated lower surfaces, adapted to meet with both smooth and corrugated support surfaces, a plurality of support ledges attached to the inner faces of said vertical legs in vertically spaced relationship said ledges being adapted to removably store said second and third horizontal support members, said second horizontal support member having at least two hinged legs attached near each end of said second support member and adapted to be rigidly secured in the open position, said third member being disposed between and removably supported by said first and second members to form a substantially continuous flat surface in open position.

2. A device according to claim 1 wherein said first, second and third horizontal support members are made of a rigid panel and a resilient panel, said panels being adapted to be used conjointly.

3. A device according to claim 1 wherein said support ledges are formed from the material of said vertical legs.

4. A device according to claim 1 wherein each of said support ledges are provided with a hump, said hump coacting with the front edge of said second and third horizontal support members to prevent accidental removed from the stored position of said second and third horizontal support members.

5. A device according to claim 1, wherein said vertical legs and said hinged legs have at least one lug on the bottom surfaces, said lug being adapted to mate with the floor surface.

References Cited by the Examiner

UNITED STATES PATENTS

| 104,358 | 6/70 | Russ | 5—14 |
| 995,234 | 6/11 | Emerson | 297—67 |
| 1,093,949 | 4/14 | Schlute | 5—18 X |
| 1,350,014 | 8/20 | Eckerman | 248—24 |
| 1,394,584 | 10/21 | Sherman | 5—14 |
| 1,448,127 | 3/23 | Konrad | 5—14 X |
| 2,053,471 | 9/36 | Frost | 297—461 X |
| 2,365,848 | 12/44 | Stone | 5—18 |
| 2,696,246 | 12/54 | Putnam | 297—236 X |

FOREIGN PATENTS

| 1,077,160 | 4/54 | France. |
| 278,877 | 2/52 | Switzerland. |

FRANK B. SHERRY, *Primary Examiner*.